United States Patent [19]

Fox

[11] Patent Number: 5,765,172

[45] Date of Patent: Jun. 9, 1998

[54] SYSTEM AND METHOD FOR VERIFYING INTEGRITY OF REPLICATED DATABASES

[75] Inventor: David L. Fox, Allen, Tex.

[73] Assignee: DSC Communications Corporation, Plano, Tex.

[21] Appl. No.: 589,928

[22] Filed: Jan. 23, 1996

[51] Int. Cl.⁶ ................................... G06F 17/30
[52] U.S. Cl. ................ 707/204; 707/200; 707/202; 707/203
[58] Field of Search ................ 395/616, 618, 395/619, 620; 707/200, 202, 203, 204

[56] References Cited

U.S. PATENT DOCUMENTS

| | | | |
|---|---|---|---|
| 4,641,241 | 2/1987 | Boram | 395/212 |
| 5,129,082 | 7/1992 | Tirfing | 395/603 |
| 5,274,802 | 12/1993 | Altine | 379/59 |
| 5,276,425 | 1/1994 | Swanson et al. | 340/826 |
| 5,432,922 | 7/1995 | Polyzois | 395/182.04 |
| 5,436,890 | 7/1995 | Read et al. | 370/58.2 |
| 5,559,991 | 9/1996 | Kanfi | 395/489 |
| 5,615,364 | 3/1997 | Marks | 395/182 |
| 5,656,475 | 8/1997 | Miller | 340/825.06 |

OTHER PUBLICATIONS

"A Study of Non-Blocking Switching Networks," by Charles Cos, *Bell System Technical Journal*, Mar. 1953, pp. 406-423.

*Primary Examiner*—Paul R. Lintz
*Assistant Examiner*—Diane D. Mizrahi
*Attorney, Agent, or Firm*—Baker & Botts, L.L.P.

[57] ABSTRACT

A method to verify the integrity of replicated databases that includes the steps of determining a checksum for a first database after updating the first database, determining a checksum for each of a number of second databases after updating each of the second databases, and comparing the checksums for the first database to that of each of the second databases to verify the integrity of each of the second databases.

23 Claims, 6 Drawing Sheets

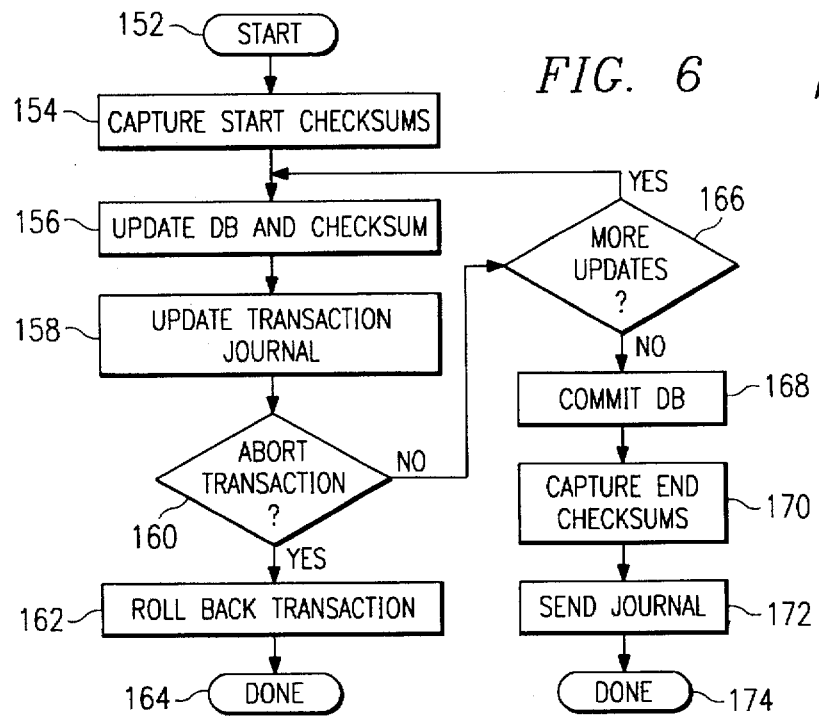
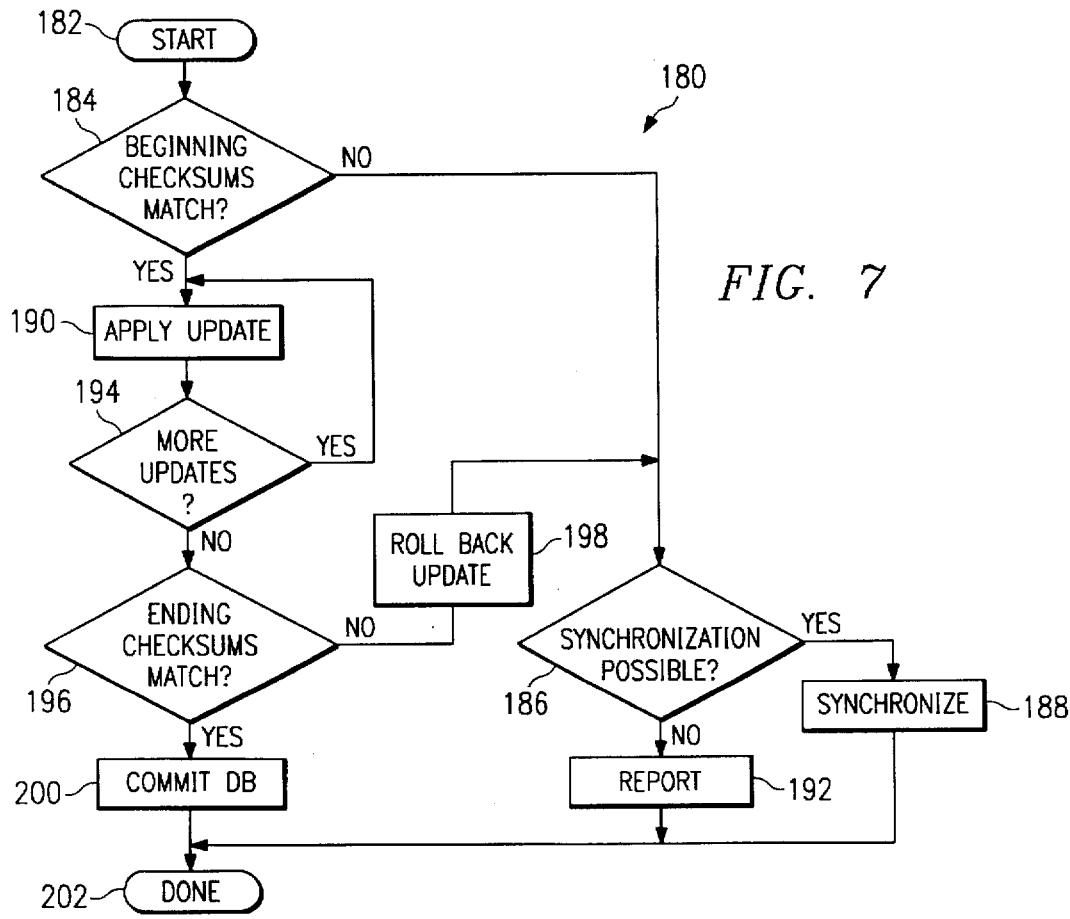

SYSTEM AND METHOD FOR VERIFYING INTEGRITY OF REPLICATED DATABASES

TECHNICAL FIELD OF THE INVENTION

This invention relates in general to the field of data transmission, and more particularly to a system and method for verifying the integrity of replicated databases.

BACKGROUND OF THE INVENTION

In the field of telephone switching systems, modern systems typically include a common control section that manages the call connection process, and a switching matrix that makes the connections. The common control section typically includes such equipment as electronic hardware modules, digital switching components, and computer controls. The switching matrix typically includes an M×N switch having M input ports and N output ports and functional to connect any one of the M input ports to any one of the N output ports. The routing of calls through the switching matrix is accomplished by the common control section.

A digital cross-connect (DCC) system is a specialized switching system that provides improved flexibility in switching services. An example of a modern DCC system is provided by U.S. Pat. No. 5,436,890 to Read et al., entitled "Integrated Multirate Cross-Connect System," assigned to DSC Communications Corporation, issued Jul. 25, 1995 (hereinafter "Read"). Such DCC systems may include a plurality of devices that define the M input ports and N output ports, an M×N connection matrix switch operable to connect any of the M input ports to any of the N output ports, and an administration subsystem that provides synchronization, monitoring, and control for remapping of the connection matrix. In addition, the DCC system taught in Read contains redundant parallel planes of all components, such that the DCC system can experience a number of failures in both planes without loss of network traffic.

The potentially large number of components in a DCC system with redundant parallel planes complicates the control of DCCs and the communication of data between components of the DCC system. Many of the components within the DCC system have data memory devices that are used to store a replicated database which defines the current status of the DCC system and components. If errors are introduced in the transmission and storage of data to these components, these replicated distributed databases may begin to diverge, that is, may no longer contain identical data.

A similar problem may be encountered with any other system that utilizes a large number of replicated and distributed databases. For example, air traffic control systems, telecommunications systems, and distributed controls systems may require replicated and distributed databases, and may experience catastrophic misoperation or failure if the distributed databases diverge.

SUMMARY OF THE INVENTION

Therefore, a need has arisen for a system and method for verifying the integrity of replicated databases. More specifically, a system and method for independently verifying the integrity of replicated and distributed databases at a transactional level is required.

One aspect of the present invention is a method to independently verify the integrity of replicated databases that includes the steps of determining a checksum value for a first database after updating the first database, determining a checksum value for a number of second databases after updating each of the second databases, and comparing the checksums for the first database to that of each of the second databases to verify that each of the second databases are identical to the first database.

Another aspect of the present invention is a method to independently verify the integrity of replicated databases. This method includes the steps of determining a first and second checksum value for a first database before and after updating the database, respectively. A first and second checksum value is then determined for each of a plurality of second databases before and after updating the plurality of second databases, respectively. Finally, the first and second checksum values determined for the first database are compared to the first and second checksum values, respectively, determined for each of the second databases before storing the changes to the second databases.

Yet another aspect of the present invention includes a system for independently verifying the integrity of replicated databases that includes a first database with a checksum calculator that calculates a checksum of the first database, a number of second databases, each having an associated checksum calculator that calculates a checksum for its associated second database, and a number of checksum comparators, each associated with a second database, that compare the first checksum and the second checksum to determine whether they are the same.

One important technical advantage of the present invention is the ability to perform a checksum process on an entire database, as opposed to a single transmitted data block. This provides additional security against database divergence due to errors that may be introduced at points other than during data transmission.

Another important technical advantage of the present invention is the ability to verify the integrity of replicated and distributed databases at a transactional level. Many database applications undergo constant updating as a result of transactions involving the database. The present invention provides a system and method for verifying the integrity of replicated and distributed databases for such applications.

Yet another important technical advantage of the present invention is the ability to synchronize a replicated and distributed database in the event that checksum failure occurs. By synchronization, retransmission of either a single transaction message or the entire database may be requested.

BRIEF DESCRIPTION OF THE DRAWINGS

For a more complete understanding of the present invention and advantages thereof, reference is now made to the following description taken in conjunction with the accompanying drawings, wherein like reference numerals represent like parts, in which:

FIG. 6 is a flowchart of a method for forming a checksum in accordance with the teachings of the present invention;

FIG. 7 is a flowchart of the transaction journal processing which occurs at each unit controller and at other locations where the database is replicated, in accordance with the teachings of the present invention.

DETAILED DESCRIPTION OF THE INVENTION

In order to better describe the present invention, the invention will be applied to data transmission requirements for a DCC system. It is understood that the invention may also be applied in a variety of other applications that involve the transmission of data to a plurality of discrete locations or devices.

Figure 1:
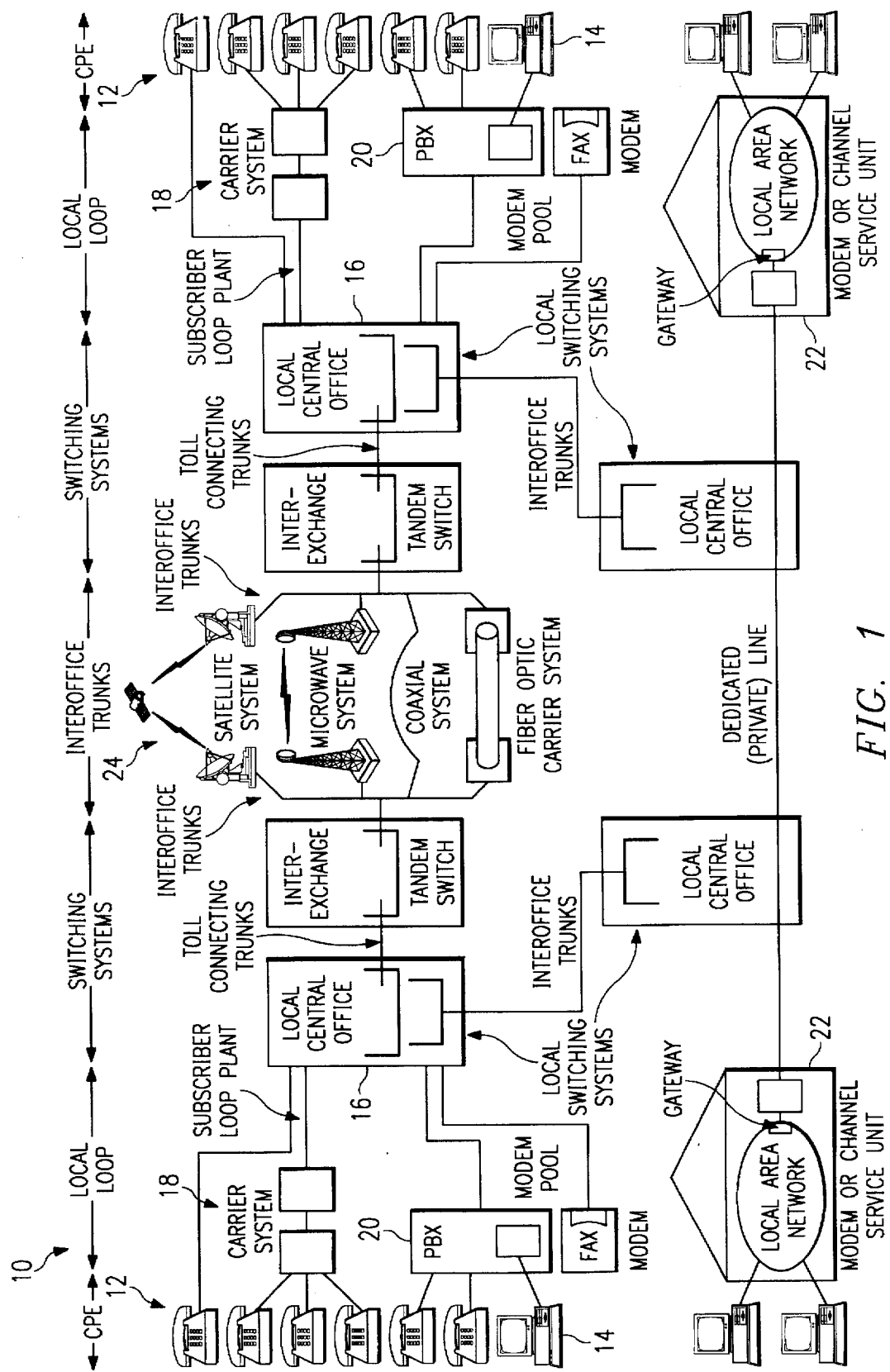
FIG. 1 shows an example of a modern telecommunications network.

FIG. 1 shows an example of modern telecommunications network 10. A plurality of telephones 12 or digital data stream sources 14 are connected to local central office 16 through carrier system 18, private branch exchange 20, local area network 22, or other distributed communications data sources. Local central office 16 is functional to connect subscribers operating within local central office 16 and is further functional to connect subscribers from local central office 16 to other subscribers through interoffice trunks 24. Interoffice trunks 24 may include satellite systems, microwave systems, coaxial systems, and fiber optic carrier systems. A DCC system is typically used at local central office 16, but may also be used at carrier system 18, private branch exchange 20, or other locations that are not explicitly shown in FIG. 1.

Figure 2:
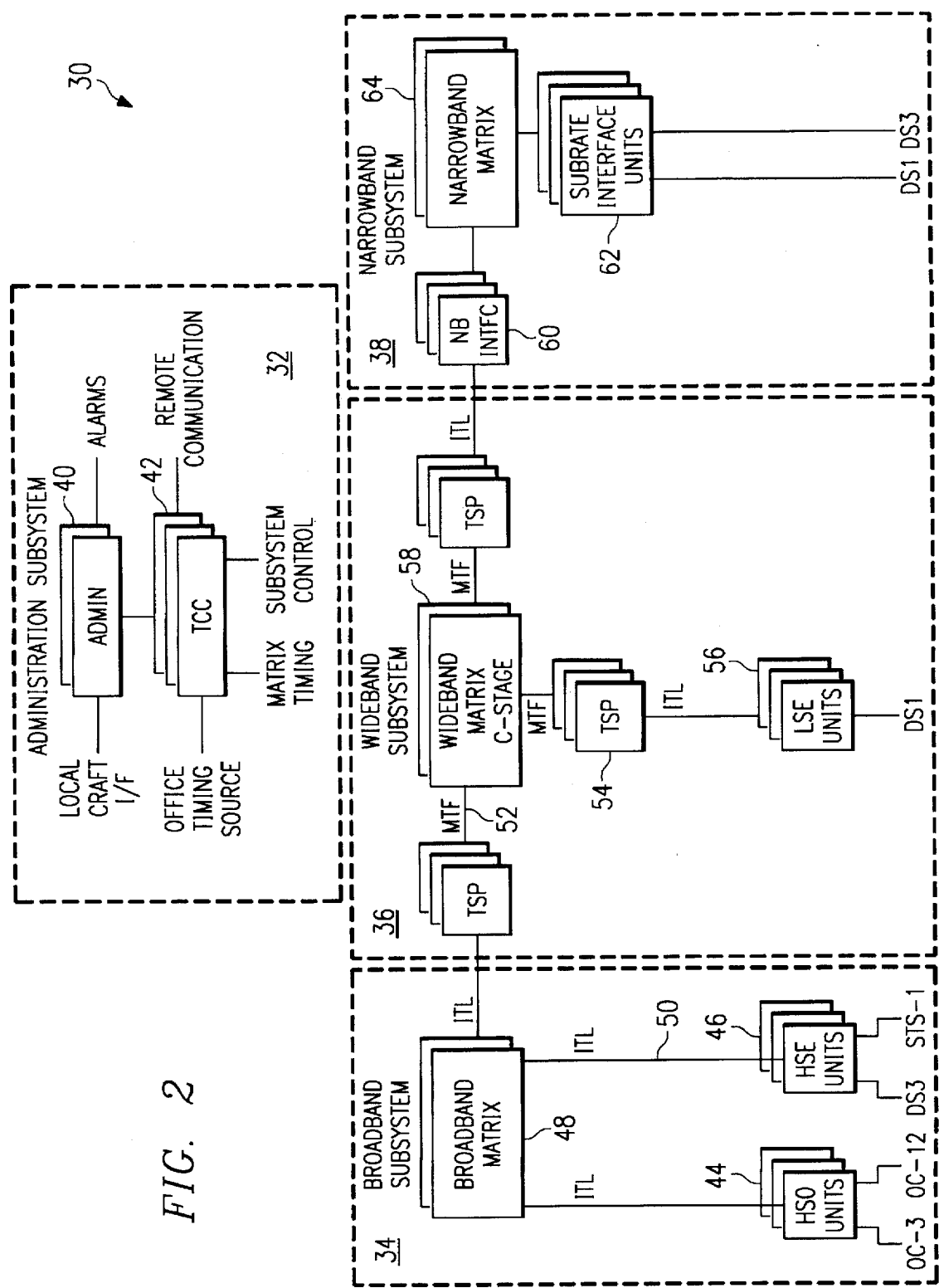
FIG. 2 shows an exemplary high level system architecture for a digital cross-connect system.

FIG. 2 presents a high level system architecture of a DCC system 30. DCC system 30 provides an integrated platform for cross-connecting signals at broadband, wideband, and narrow band levels and supports cross-connection of both domestic and international rates and formats. For purposes of this description, discussion is limited to domestic signaling at DS0, DS1, DS3, STS-1, OC3, and OC12 rates, though DCC system 30 may also process signals at other rates.

DCC system 30 terminates synchronous optical (OC3, OC12), synchronous electrical (STS-1), and asynchronous electrical (DS3, DS1) network signals. Cross-connection is provided via a multi-rate, multi-subsystem architecture that insures maximum flexibility at all network levels. With multiple subsystems under a single administration control, DCC system 30 manages individual high capacity, non-blocking matrix subsystems in order to perform cross-connections. DCC system 30 includes an administration subsystem 32 and matrix subsystems including a broadband subsystem 34, a wideband subsystem 36 and a narrowband subsystem 38.

Administration subsystem 32 includes an administration unit 40 and a timing/communication controller (TCC) unit 42. Administration unit 40 performs operations, administration, maintenance, and provisioning (OAM&P) functions for DCC system 30. Administration unit 40 also provides communications interfaces to users and with central office discrete signals. Administration unit 40 handles system control for DCC system 30 through a hierarchical distribution scheme among the various components of the system, as described below.

Timing/communications controller (TCC) unit 42 provides communications and timing functions for DCC system 30. TCC unit 42 may receive an office timing source to generate the internal timing for synchronizing broadband subsystem 34, wideband subsystem 36, and narrowband subsystem 38. TCC unit 42 further controls each component within DCC system 30 through an hierarchy of controllers as supervised by administration unit 40. Timing synchronization may also be derived from network signals for distribution to each subsystem. Synchronization and control information from administration unit 40 are distributed throughout DCC system 30 by TCC unit 42.

Broadband subsystem 34 includes high speed optical (HSO) units 44 and high speed electrical (HSE) units 46 that are coupled to a broadband matrix unit 48. HSO units 44 and HSE units 46 are data transceivers. Broadband system 34 supports network termination of signals including DS3, STS-1, OC3, and OC12 signals as well as international termination capability. Internal transmission link 50 carries optical signals and permits flexibility in physical arrangement and location of DCC system 30 components.

Wideband subsystem 36 signals are cross-connected at VT1.5 through VT6 rates into internal synchronous channels 52 having a wideband matrix transport format (MTF) of a matrix payload envelope capable of carrying the VT-rated signal. Higher rate network signals including DS3 and STS-1 discussed in conjunction with broadband subsystem 34 will normally access wideband subsystem 36 for tributary access or switching through broadband subsystem 34 over ITLs 50 and tributary signal processing (TSP) unit 54. TSP units 54 are data transceivers.

Wideband subsystem 36 includes low speed electrical (LSE) units 56, TSP units 54, and wideband matrix center stage 58. LSE units 56 are data transceivers. Wideband subsystem 36 supports network termination of DS3 and DS1 signals as well as international termination capability. Network signals are cross-connected through wideband subsystem 36 in an internal matrix transport format.

Narrowband subsystem 38 includes narrowband interface unit 60, subrate interface units 62, and narrowband matrix unit 64. Narrowband interface units 60 and subrate interface units 62 are data transceivers. Narrowband subsystem 38 signals may be cross-connected at a DS0 rate. An optional subrate interface unit 62 provides direct electrical termination of signals at the DS1 and DS3 rates. However, instead of direct signal termination, narrowband subsystem 38 normally accesses network traffic through wideband subsystem 36.

DCC system 30 may use redundant data paths in coupling each component together to increase operational reliability. Each subsystem may be organized in dual independent planes with no cross-coupling within the planes. In this configuration, each HSO unit 44, HSE unit 46, LSE unit 56, TSP unit 54, and other data transceiver within each subsystem has access to both planes and is capable of independently selecting an active plane. Thus, a number of failures can be accommodated in both planes without loss of network traffic.

Figure 3:
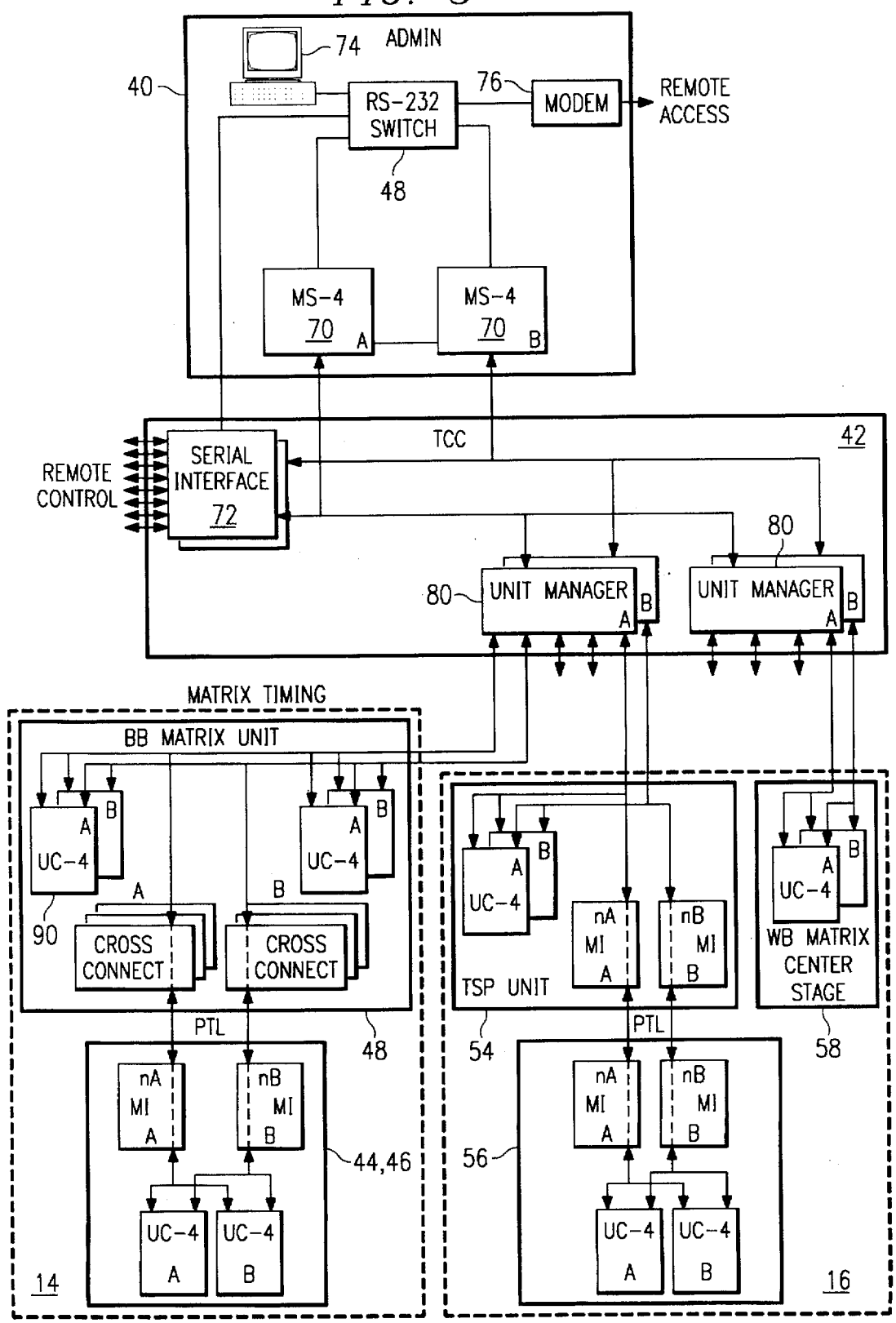
FIG. 3 is an exemplary high level view of a control structure for a digital cross-connect system.

FIG. 3 is a high level view of the control structure for DCC system 30. Top level control is found within administration unit 40 of administration subsystem 32. Administration unit 40 includes redundant processors 70 to provide the platform to perform OAM&P functions. Processors 70 perform the monitoring and control for DCC system 30. Processors 70 interface with central office discrete signals through a serial interface 72 to perform top level monitoring and control for DCC system 30. Maintenance access to processors 70 is accomplished either through a local terminal 74 or by remote access through a modem 76. An RS232 switch 78 determines whether access to processors 70 is by local or remote terminals. Processors 70 are operable to calculate a checksum on a database stored within internal memory or on a database stored within an external memory device accessible by administration unit 40.

The second tier in the control hierarchy is the configuration of unit managers 80 found within timing/communications control unit 42. Unit managers 80 may be used individually or in parallel to provide a redundant communications and control path between processor 70 and the third level of the control hierarchy. Intra system control information is sent from administration unit 40 to unit manager 80. Unit managers 80 provide intermediate level OAM&P functions. Communications between processors 70 and unit managers 80 may be accomplished by a network, such as a redundant Ethernet local area network (LAN). Serial interface 72 provides communications between an external source and processors 70 and unit managers 80.

The third tier of the control hierarchy is performed by unit controllers 90 located in each component of broadband subsystem 34, wideband subsystem 36, and narrowband subsystem 38. Unit controller 90 controls and monitors functions provided by the associated matrix units and performs the low level OAM&P function. Control information transmitted between unit managers 80 and unit controllers 90 may be carried on ITLs 50 or through direct cabling connections as determined by local constraints. Redundant unit controllers 90 may be found in all components of each subsystem including HSO units 44, HSE units 46, broadband matrix unit 48, LSE 56, TSP 54, and wideband center stage matrix 58.

Each unit controller 90 is operable to calculate a checksum on a database stored within the internal memory of a given unit controller 90 or on a database stored within an external memory device accessible by a given unit controller 90. Furthermore, each unit controller 90 is operable to determine whether the calculated checksum matches a checksum transmitted from administration unit 40 or any other processor. If the checksums do not match, each unit controller 90 is also operable to synchronize such databases by determining whether a single update message has not been transmitted, to request retransmission of the single message, and to request retransmission of the entire database from administration unit 40 if the database cannot be synchronized by transmission of a single update message.

Thus, processors 70 are connected through ITLs 50 to each other, and to unit managers 80 which are connected through ITLs 50 to unit controllers 90 within broadband matrix unit 48, HSO units 44, HSE units 46, LSE units 56, and TSP units 54. Although individual unit controllers 90 and unit managers 80 contain software that controls their individual function, coordination of all components is performed by software within processors 70 in administration unit 40.

In addition, as shown in FIG. 3, processors 70, unit managers 80, unit controllers 90, and various other components that are not explicitly shown are arranged in parallel planes "A" and "B." These planes are completely redundant, in that a number of failures may be accommodated on both planes without loss of network traffic. Processors 70 may perform data quality analysis on the redundant data channels and transmit the data channel having the highest quality of the two redundant channels.

Because of the complexity of DCC system 30, the system-controlled software that runs on controllers 70 in administration unit 40 is one of the most important components of DCC system 30. Many configurations of this software are possible. For example, some software packages that may be required to run on processors 70 and administration unit 40 include software for user interface and validation, software for connection setup, software for control of the hardware components individually or as a coordinated system, and software for determining connections between the broadband, wideband, and narrowband cross-connect matrices.

Figure 4:
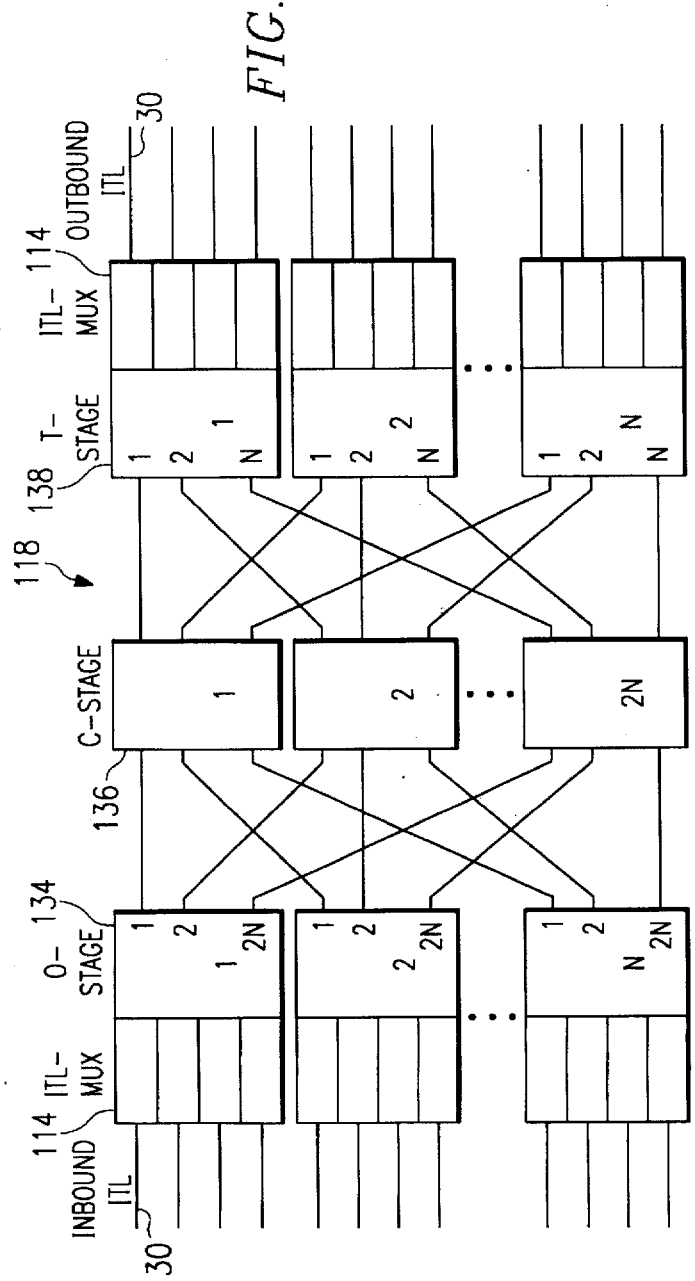
FIG. 4 is a block diagram of a cross-connect matrix.

FIG. 4 shows a block diagram of cross-connect matrix 118. Cross-connect matrix 118 uses a three-stage architecture capable of switching M input ports to N output ports. The three matrix stages for cross-connect matrix 118 are designated as originating stage 134, center stage 136, and terminating stage 138, each of which may be a plurality of discrete devices. In broadest terms, originating stage 134, center stage 136, and terminating stage 138 are data transceivers. ITL multiplexers (ITL-MUXS) 114 are directly connected to originating stage 134 and terminating stage 138 of cross-connect matrix 118. Connections are made from originating stage 134 and terminating stage 138 to center stage 136. A database containing the present status of cross-connect matrix 118 must be maintained and accessible by processors 70 and unit controllers 90.

Administration unit 40 receives routing data for cross-connect matrix 118 through RS-232 switch 78 from serial interface 72, local terminal 74, or modem 76. Administration unit 40 transmits switching operations commands to each individual unit controller 90 over ITLs 50. Each individual unit controller 90 includes a memory device, and maintains a database of the present configuration of the switching matrix. In the absence of a system and method for verifying the integrity of these replicated databases, there exists a chance that some of the replicated databases will diverge. Divergence may occur for many reasons, such as because of errors in data transmission, or errors in data processing due to local power fluctuations, or local electromagnetic interference. In order to prevent divergence of these replicated and distributed databases, a system and method for verifying the integrity of these replicated databases is required.

Figure 5:
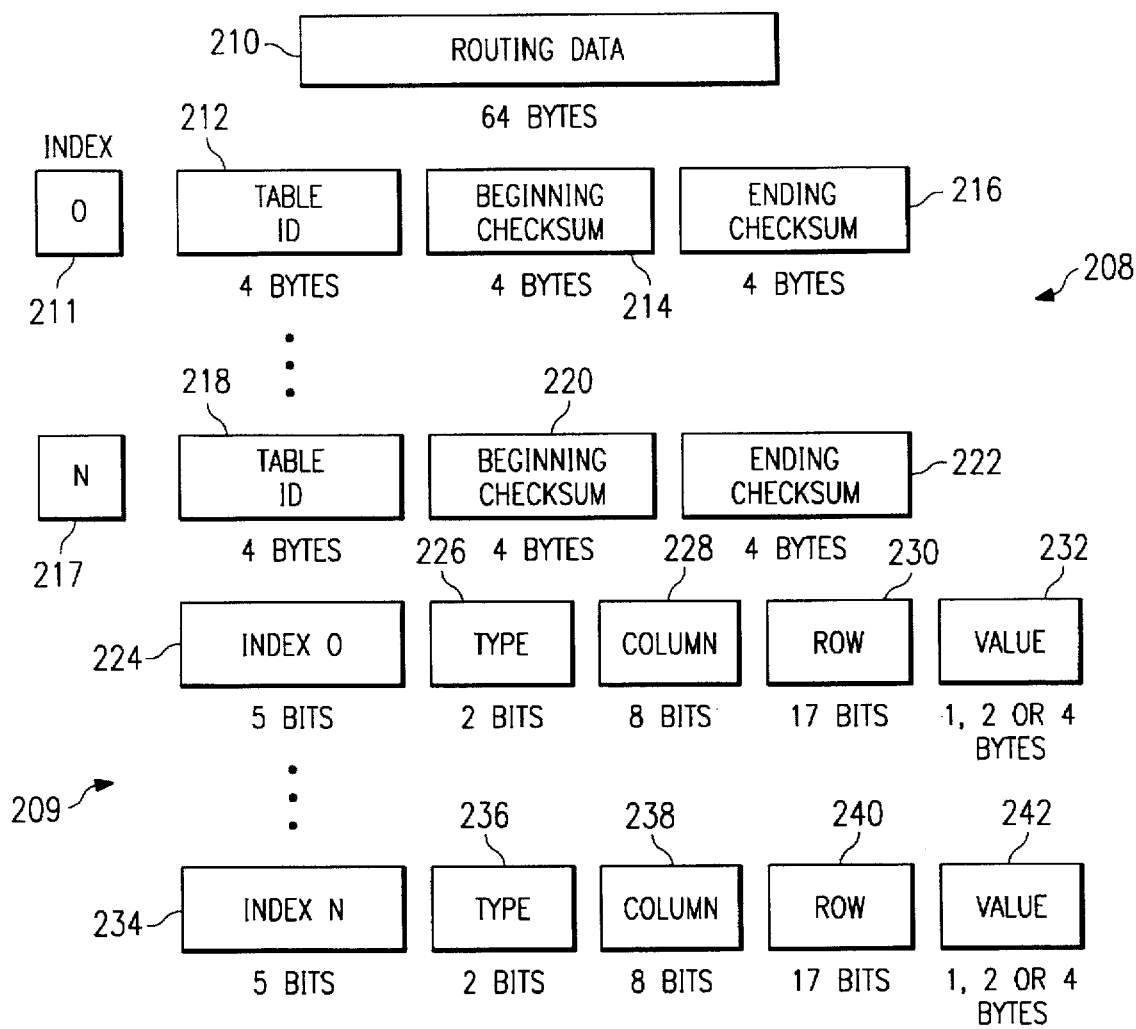
FIG. 5 is an example of a transaction journal format and database update format that may be used to help verify the integrity of a replicated database in accordance with the teachings of the present invention.

FIG. 5 is an example of a transaction journal format and database update format that may be used to help verify the integrity of a replicated database in accordance with the teachings of the present invention. As previously described, control data are transmitted from processors 70 in administration unit 40 to unit managers 80 and finally to unit controllers 90. This control data may include database updates to the local database storing the configuration of cross-connect matrix 118. Transaction journal message 208 is transmitted from processors 70 to unit controllers 90 either immediately prior to or immediately after transmission of database update formats 209. Unit controllers 90 or other devices that are operable to update the replicated database are also operable to receive transmission journal 208 and database update formats 209. Transaction journal message 208 and database update formats 209 are transmitted with routing data block 210 that contains 64 bytes of data. Unit controllers 90 and other components that manage a replicated database recognize routing data block 210 and retrieve transaction journal message 208 and database update formats 209 when they are broadcast over the network formed by ITLs 50.

Transaction journal message 208 further includes index data blocks 211 and 217, which contain the index numbers assigned to the table identifiers in table ID blocks 212 and 218, respectively. The database that defines the current state of cross-connect matrix 118 is comprised of a plurality of tables, each having a different number of columns and rows. Blocks 214 and 220 contain the beginning checksum associated with table ID blocks 212 and 218, respectively. Likewise, blocks 216 and 222 contain the ending checksum associated with table ID blocks 212 and 218, respectively. The beginning checksum is the checksum for the associated table prior to updating the table, and the ending checksum is the checksum for the associated table after updating the table. A checksum is a number that is derived from the data in the table, such as by adding every entry in the table. Under certain circumstances, it may be sufficient to transmit only the ending checksum, such that blocks 214 and 220 are not required.

An example of database update format 209 is also shown in FIG. 5. Blocks 224 and 234 contain index data that identifies the table in the database that is being updated. Blocks 228 and 238 contain the column position of the associated table and blocks 230 and 240 contain the row position of the associated table. Blocks 226 and 236 contain the size type of database update block 232 and 242 associated with index block 224 and 234, respectively, i.e. a one byte, two byte, or four byte database update type. As previously noted, these database updates may be transmitted either before or after transaction journal message 208, but will typically be included after routing data block 210. Those skilled in the art will recognize that other transaction journal message formats and database update formats may be used without departing from the scope or the spirit of the present invention.

FIG. 6 is a flowchart of a method for forming a checksum in accordance with the teachings of the present invention. After initializing the process at step 152, the beginning checksums are computed at step 154. For example, the beginning checksums may be determined by adding every entry in the table. At step 156, the database and checksums are updated with all presently available updates, and transaction journal message 208 is updated at step 158. At step 160, the transaction may be aborted, if required. Several examples of reasons why the transaction may need to be aborted include when the database or journal update cannot be completed locally, when a message cannot be transmitted to another processor, or when resources that are needed to complete the transaction cannot be obtained.

If the transaction is to be aborted, the database is rolled-back at step 162. Rolling-back consists of returning the database to its condition prior to being updated, as known in the art. After database roll-back, method 150 is completed until the next set of updates is to be processed. If the transaction does not need to be aborted, more updates are tested for at step 166. If there are more updates to be processed, the method returns to step 156. Otherwise, the updates are permanently stored to the database at step 168. After the end checksums are captured at step 170, transaction journal message 208 is updated and transmitted to the replicated database at step 172. Method 150 is then completed at step 174 until the next set of updates is to be processed.

FIG. 7 is a flowchart of the journal processing which occurs at each unit controller 90 and at other locations where the database is replicated, in accordance with the teachings of the present invention. In the example shown in FIG. 7, journal processing occurs after the receipt of all updates in a given transaction but before the database is committed. After initializing the process at step 182, the beginning checksums are retrieved from transaction journal message 208 at step 184 and are compared with the beginning checksums calculated locally. If the beginning checksums do not match, the database is analyzed to determine whether database synchronization, as known in the art, is possible, for example, if one update entry is missing. The database is synchronized, as known in the art, at step 188 if possible, otherwise the mismatch is reported at step 192.

If the beginning checksums match, then the present database updates are applied at step 190. Additional updates are tested for at step 194, and if none are present, then the ending checksums are compared at step 196. If the ending checksums do not match, the update is rolled-back, and the database is checked to determine whether synchronization is possible, as previously described at steps 186, 188, and 192. If the ending checksums match, the database is committed at step 200, and the routine is completed at step 202.

Figure 8:
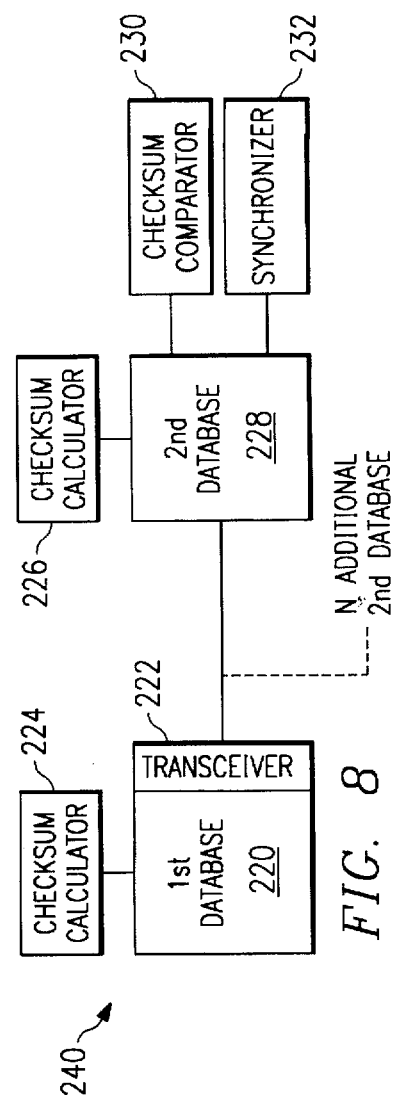
FIG. 8 is an exemplary block diagram of a system for verifying the integrity of replicated databases in accordance with teachings of the present invention.

FIG. 8 is an exemplary block diagram of a system for verifying the integrity of replicated databases 240. System 240 contains first database 220 with an associated checksum calculator 224 and transceiver 222. First database 220 receives database update messages from an input (not explicitly shown), and checksum calculator 224 calculates a checksum of first database 220. As previously described, this checksum can include a separate checksum for each of a number of tables that make up first database 220. Transceiver 222 transmits the updates and the calculated checksum to at least one second database 228.

Second database 228 has an associated checksum calculator 226, checksum comparator 230, and synchronizer 232. Checksum calculator 226 calculates a checksum of second database 228. Checksum comparator 230 compares the checksum of first database 220 with the checksum of second database 228. If the checksums match, then second database 228 stores the updates. If the checksums do not match, synchronizer 232 synchronizes first database 220 and second database 228. For example, synchronizer 232 might determine that retransmission of a single update message is needed to synchronize second database 228, or it might request retransmission of entire database 220 or a component part thereof.

Although the present invention has been described in detail, it should be understood that various changes, substitutions, and alterations can be made hereto without departing from the spirit and scope of the invention as defined by the appended claims.

What is claimed is:

1. A method to verify the integrity of replicated databases in a telecommunications network, comprising the steps of:
    determining a checksum for a first database after performing a series of changes on the first database;
    determining a checksum for each of at least one second database after performing the series of changes on each second database;
    comparing the checksum for the first database to the checksum for each second database; and
    storing the changes made to a specific second database if the checksum for the first database matches the checksum for the specific second database.

2. The method of claim 1, further comprising the step of transmitting the checksum for the first database and the series of changes to each second database after the step of determining a checksum for the first database.

3. The method of claim 1, further comprising the step of restoring the specific second database to its original configuration if the checksum for the first database does not match the checksum for the specific second database.

4. The method of claim 1, further comprising the step of synchronizing a second database if the checksum for the first database does not match the checksum for the second database.

5. The method of claim 1, wherein the step of determining a checksum for a first database further comprises the steps of:
- determining a checksum for each of at least one table that comprises the first database;
- assigning an index number to each table that comprises the first database;
- forming a data block for each table that includes an index number block and a checksum block; and
- forming a transaction journal message that includes a data block for each table.

6. The method of claim 1, wherein the step of determining a checksum for each of at least one second database further comprises the steps of:
- determining a checksum for each of at least one table that comprises each second database;
- assigning an index number to each table that comprises each second database; and
- forming a data block for each table that comprises each second database that includes an index number block and a checksum block.

7. The method of claim 1 wherein the step of comparing the checksum for the first database to the checksum for each second database further comprises the steps of:
- retrieving the data block for each table that comprises the first database;
- retrieving the data block for each table that comprises the second database; and
- comparing the checksum for each table that comprise the first database with the checksum for each corresponding table of each second database.

8. The method of claim 1, further comprising the steps of:
- testing for the presence of an abort signal;
- aborting the step of storing the changes made to each second database if an abort signal is present; and
- rolling back the first database to its state before performing the series of changes.

9. The method of claim 1, further comprising the step of synchronizing a specific second database if the checksum for the first database does not match the checksum for the specific second database.

10. A method to verify the integrity of replicated databases in a telecommunications network, comprising the steps of:
- determining a beginning checksum for a first database before a series of changes are made to the first database;
- determining an ending checksum for the first database after the series of changes are made to the first database;
- determining a beginning checksum for each of at least one second database before the series of changes are made to each second database;
- determining an ending checksum for each second database after the series of changes are made to the second database; and
- comparing the beginning and ending checksums determined for the first database to the corresponding beginning and ending checksums for each of the second databases before storing the changes to each of the second databases.

11. The method of claim 10, further comprising the step of transmitting the beginning and ending checksums determined for the first database and the series of changes to each second database after the step of determining an ending checksum for the first database.

12. The method of claim 10, further comprising the step of restoring a specific second database to its original configuration if the ending checksum for the first database does not match the ending checksum for the specific second database.

13. The method of claim 10, further comprising the step of synchronizing a specific second database if the beginning and ending checksums for the first database do not match the corresponding beginning and ending checksums for the specific second database.

14. The method of claim 10, wherein the step of determining a beginning checksum for a first database further comprises the steps of:
- determining a checksum for each of at least one table that comprises the first database;
- assigning an index number to each table that comprises the first database;
- forming a first data block for each table that includes an index number block and a checksum block; and
- forming a transaction journal message that includes a first data block for each table.

15. The method of claim 10, wherein the step of determining an ending checksum for the first database further comprises the steps of:
- determining a checksum for each of at least one table that comprises the first database;
- assigning an index number to each table that comprises the first database;
- forming a second data block for each table that includes an index number block and a checksum block; and
- forming a transaction journal message that includes a second data block for each table.

16. The method of claim 10, wherein the step of determining a beginning checksum for each second database further comprises the steps of:
- determining a checksum for each of at least one table that comprises each second database;
- assigning an index number to each table that comprises each second database; and
- forming a first data block for each table that comprises each second database that includes an index number block and a checksum block.

17. The method of claim 10, wherein the step of determining an ending checksum for each second database further comprises the steps of:
- determining a checksum for each of at least one table that comprises each second databases;
- assigning an index number to each table that comprises each second database; and
- forming a second data block for each table that comprises each second database that includes an index number block and a checksum block.

18. The method of claim 10 wherein the step of comparing the beginning and ending checksums determined for the first database to the corresponding beginning and ending checksums determined for each second database further comprises the steps of:
- retrieving the first and second data blocks from the transaction journal message for each table that comprises the first database; and
- comparing the beginning and ending checksum for each table that comprises the first database with the corresponding beginning and ending checksum for each table that comprises each second database.

19. The method of claim 10, further comprising the steps of:

testing for the presence of an abort signal;

aborting the step of storing the changes made to each second database if an abort signal is present; and rolling back the first database to its state before performing the series of changes.

20. The method of claim 10, further comprising the steps of:

synchronizing a second database if the beginning checksum for the first database does not match the beginning checksum for the second database; and synchronizing a second database if the ending checksum for the first database does not match the ending checksum for the second database.

21. A system for verifying the integrity of replicated databases in a telecommunications network, comprising:

a first checksum calculator for a first database, wherein the first checksum calculator is operable to calculate a checksum of the first database;

at least one second database, each having an associated second checksum calculator, wherein the second checksum calculator is operable to calculate a checksum of the associated second database; and at least one checksum comparator, each associated with a second database, wherein each checksum comparator is operable to compare the checksum of the first database to the checksum of the second database to determine whether they are the same.

22. The system of claim 21, further comprising at least one synchronizer, each synchronizer associated with a second database and operable to analyze the second database to determine when to request retransmission of a missing single update message and when to request transmission of the entire database.

23. The system of claim 21, further comprising a data transceiver operable to transmit the checksum of the first database to each of the second databases.

* * * * *